United States Patent
Dohmen et al.

(10) Patent No.: US 7,184,475 B2
(45) Date of Patent: Feb. 27, 2007

(54) ADJUSTMENT FOR EQUALIZATION PARAMETERS IN RECEIVERS

(75) Inventors: Ralf Dohmen, Bayern (DE); Christoph Schulien, Altdorf bei Nuernberg (DE); Herbert Haunstein, Dormitz (DE); Achim Herzberger, Heroldsberg (DE); Georg Roell, Postbauer-Heng (DE); Konrad Sticht, Eschenbach (DE)

(73) Assignee: Lucent Technologies Inc., Murray Hill, NJ (US)

( * ) Notice: Subject to any disclaimer, the term of this patent is extended or adjusted under 35 U.S.C. 154(b) by 661 days.

(21) Appl. No.: 10/054,551

(22) Filed: Jan. 22, 2002

(65) Prior Publication Data

US 2002/0181573 A1    Dec. 5, 2002

(30) Foreign Application Priority Data

Feb. 12, 2001    (EA)    .................................. 01301194

(51) Int. Cl.
  *H03H 7/30*    (2006.01)
  *H03K 5/159*    (2006.01)
  *G06F 17/10*    (2006.01)
  *H04B 3/14*    (2006.01)

(52) U.S. Cl. ..................... 375/232; 708/323; 333/28 R
(58) Field of Classification Search ........ 375/232–233, 375/229–230, 240.29, 240.27, 340; 359/156; 708/322, 323; 714/752, 758, 759, 760
See application file for complete search history.

(56) References Cited

U.S. PATENT DOCUMENTS

| 5,374,861 | A  |    | 12/1994 | Kubista |     |
|-----------|----|----|---------|---------|-----|
| 5,572,547 | A  |    | 11/1996 | Citta   |     |
| 5,787,118 | A  |    | 7/1998  | Ueda    |     |
| 5,828,422 | A  | *  | 10/1998 | Gaudreau | 348/614 |
| 6,226,323 | B1 | *  | 5/2001  | Tan et al. | 375/233 |
| 6,295,152 | B1 | *  | 9/2001  | Wedding | 398/209 |
| 6,583,903 | B1 | *  | 6/2003  | Way et al. | 398/152 |
| 6,735,725 | B1 | *  | 5/2004  | Wu et al. | 714/704 |
| 6,963,528 | B2 | *  | 11/2005 | Ogura   | 369/59.22 |
| 2005/0008070 | A1 | * | 1/2005 | Wang et al. | 375/232 |

FOREIGN PATENT DOCUMENTS

EP    0954 126 A1    11/1999

OTHER PUBLICATIONS

"Survey of computer communications loop networks: Part I", BK Penney an AA Baghdadi, Aug. 1979, IEEE vol. 2 No. 4.*
"Computer Communications", IEEE vol. 2, No. 4, Aug. 1979.*
European Search Report dated Jan. 21, 2002.

* cited by examiner

*Primary Examiner*—Kevin Kim
*Assistant Examiner*—Linda Wong

(57) ABSTRACT

A method of adjusting equalization parameters in a receiver wherein a bit error rate (BER) in a data stream is measured from the number of corrected bits in data blocks which have an information section and an error correction section. A predetermined equalization parameter is changed, and the bit error rate (BER) after change is again measured to find out how to change the predetermined equalization parameter until an optimum is reached.

When adjusting the threshold value of the receiver, the history of occurring bits preceding the actual sampled bit is taken into consideration in that the amount and direction of adjustment is derived from a look-up table.

4 Claims, 5 Drawing Sheets

ADJUSTMENT FOR EQUALIZATION PARAMETERS IN RECEIVERS

CROSS REFERENCE TO RELATED APPLICATION

This application claims priority of European Application No. 01301194.5 filed on Feb. 12, 2001.

FIELD OF THE INVENTION

The invention relates to a method of adjusting equalization parameters in receivers and to a receiver adapted to carrying out the adjusting method, and particularly to adjust the threshold value in deciding between signal values 0 and 1.

BACKGROUND OF THE INVENTION

In fiber optical transmission systems the tolerable optical signal to noise ratio (OSNR) is reduced by distortions, e.g. chromatic dispersion, polarization mode dispersion, chirp, extinction, ratio, four wave mixing, self phase modulation, cross phase modulation which can lead to inter symbol interference (ISI) and therefore to bit errors in the transmitted data stream. The optical signal to noise ratio (OSNR) can be increased when an adaptive receiver with equalization is used, since such receiver reduces the so-called eye opening penalty. The data stream may include a forward error correction code (FEC) which allows to improve the bit error rate (BER) for a given signal to noise ratio (SNR). This additional information from FEC is used to correct bit errors in the data stream when such data is decoded in the receiver. There is a great number of error correction codes in use, for example Bose-Chaudhury-Hoequengheen (BCH) and Reed-Solomon (RS), which fit for sonet/SDH digital wrapper formats. If the error rate of the data stream is below the error correction capability of the respective error correction code, the bit errors can be corrected.

For an adaptive channel equalization, a channel model must be established which means measurement of analog signals in which the information is embedded. Therefore, an analog-to-digital conversion of sampled signals has to be performed. Such analog-to-digital converter (ADC) is a critical item at high data rates. Also a simple eye monitor which measures the probable density of signal samples can be used for the purpose indicated. Equalization parameters are varied and adapted according to a control algorithm until best performance is obtained. In any case, additional expensive circuitry is needed for the equalization procedure.

SUMMARY OF THE INVENTION

The invention seeks to adjust equalization parameters of a receiver in a transmission system for high bit rate with minimum costs. Particularly, an optimum threshold value at the receiver input is aimed at.

The invention is defined in the independent claims. A receiver is presupposed having an analog filter equalizer, a clock recovery unit, an equalizer including error correction means, and adaption determining means. In such receiver, the data stream having blocks with an information section and an error correction section is sampled, and a bit error rate from the number of corrected bits in the data block is obtained. According to invention, a predetermined equalization parameter is changed, and the bit error rate is measured after the change of parameter. When the bit error rate improves, the direction of change of parameter will be continued, if the bit error rate has deteriorated the direction of change will be reversed. In such a way, an optimum for the respective equalization parameter can be found.

The invention is particularly applicable in adjusting the receiver threshold to discriminate between the bit values 0 and 1.

In a further development, the invention is a method of adjusting threshold values in receivers wherein features of the data stream are taken into consideration to adjust the threshold value, and for that purpose a look-up table is established for assigning bit stream characteristics to amount and direction of adjustment.

In terms of apparatus, the receiver has flip-flop means which the digital data stream passes through, and counters for corrected 0's and 1's in the kind of a look-up table for providing signals indicating the amount and direction of adjustment of the receiver threshold.

With the invention, particularly an optimum threshold value is intended to be reached based on prior received data. These prior received data include properties of the transmission channel in respect of distortion and noise. As usual, the incoming data are decoded in an error correction unit. Practically without extra expense, the bit error rate, is obtained and can be used in the adaption or fine adjustment of the receiver threshold.

DESCRIPTION OF THE PREFERRED EMBODIMENTS

Figure 1:
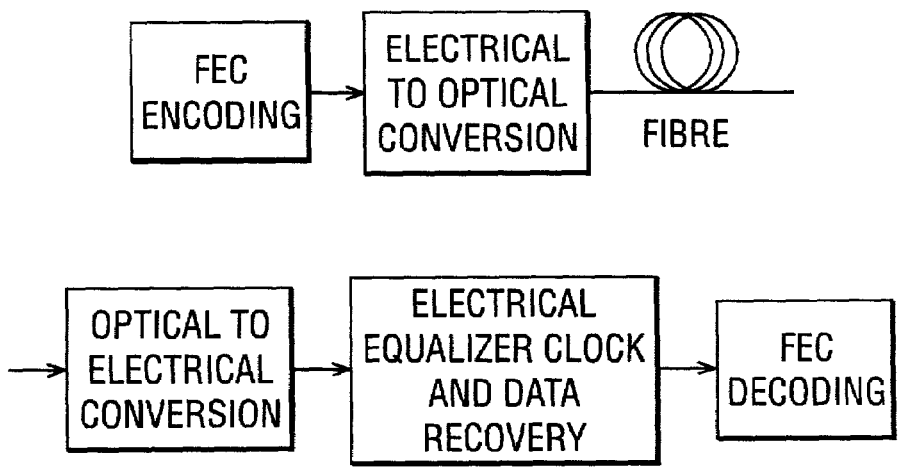
FIG. 1 is a schema of an optical transmission channel.

FIG. 1 shows the components of an optical transmission channel. The transmitter includes an encoder for forward error correction FEC and an electrical-to-optical converter which supplies the data stream through optical fibers to an optical-to-electrical converter in the receiver. The electrical signals appear as analog signals and must be converted to digital signals. For that end, an electrical equalizer and means for recovery clock and data information are provided. These means include an FEC decoder.

Figure 2:
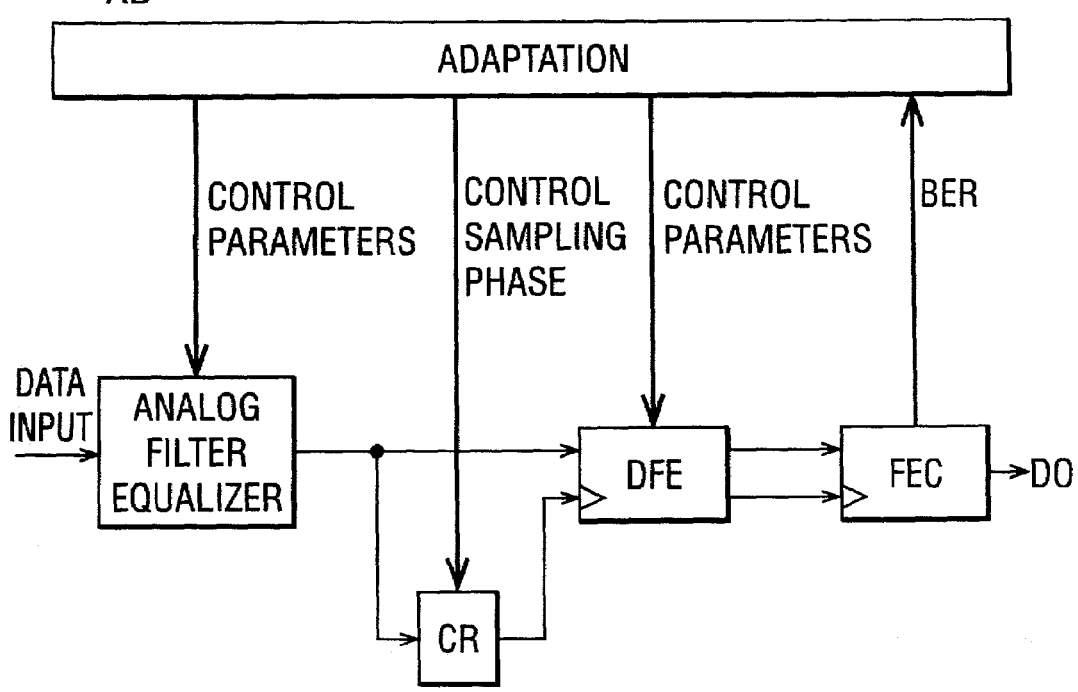
FIG. 2 is a schema of a receiver.

FIG. 2 shows a scheme of a receiver. Data received are passed through an analog filter or equalizer and a decision feedback device DFE. The decoder FEC may be considered as a portion of an digital filter or equalizer. Means are provided for clock recovery CR which include a phase-locked loop and a voltage-controlled oscillator so that the correct phase in sampling the incoming analog signal is obtained and an analog to digital conversion is made in the decision feedback equalizer DFE.

The decoder FEC not only corrects the data from the decision feedback device DFE, but also provides for a bit error rate signal BER. This signal BER includes values for errored 0's and 1's. An adaption circuitry AD is provided which may influence parameters in the several receiver components as indicated by arrows. One of these parameters is selected to be changed which will have an influence on the signal BER. If the bit error rate increases, the direction of changing the parameter was wrong and will be reversed. The further parameters are varied similarly to obtain better results, measured with the signal BER. By this method of trial and error, the several parameters are brought to an optimum.

Figure 3:
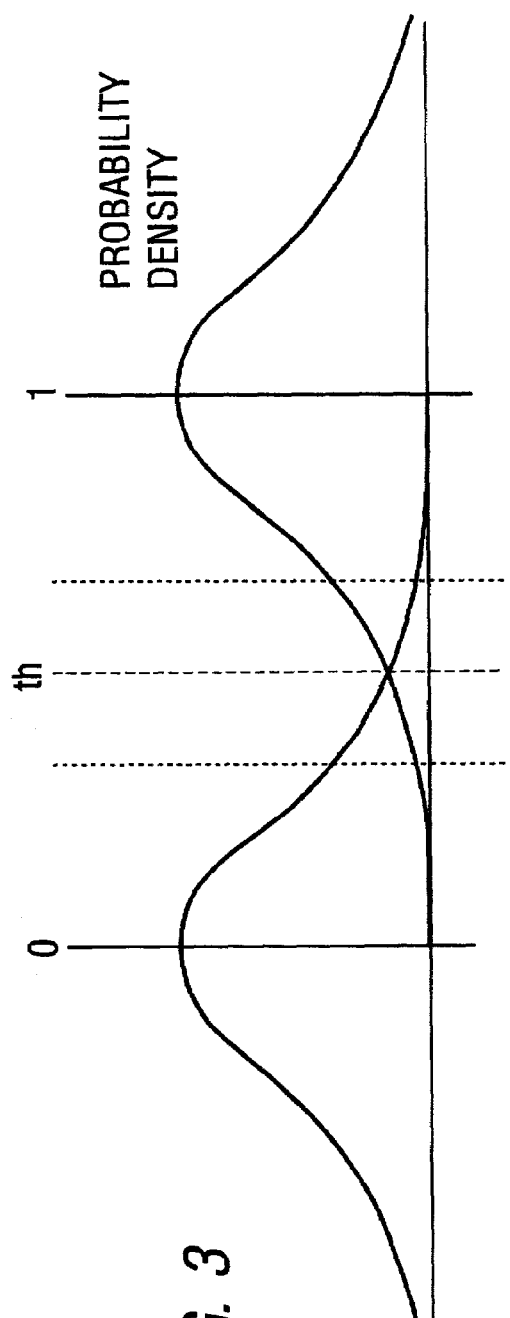
FIG. 3 is a graph of the probability of occurring bit values 0 and 1 in the average.

FIG. 3 shows the distribution of incoming signals with probable densities of bit values 0 and 1 across signal strength as the abscissa. The graphs cross, that is, a region exists where there is probability of occurring both values, 0 and 1. A line th is shown which indicates a threshold where the number of errored 0's is equal to the number of errored 1's. In an all-over consideration, the threshold th is at an optimum value.

Figure 4:
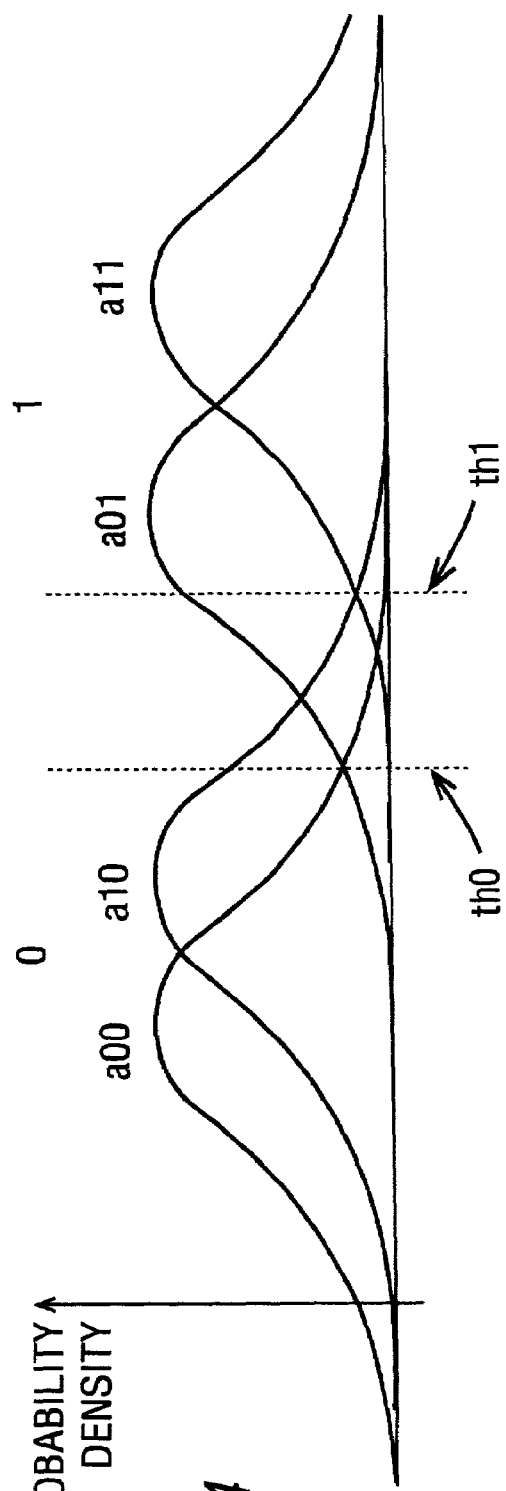
FIG. 4 is a graph of the distribution of the bit values for different signal transitions.

The probable density of bit values, however, is not constant over time in transmission channels. The graphs shift to the right hand side or left hand side dependent upon the transitions 00, 10, 01, 11 which is indicated in FIG. 4. For preceding 0's, the graph is shifted to the left (areas a00, a01), and for preceding 1's, the graph is shifted to the right (areas a10, a11), in relation to the graphs in FIG. 3. When there is a precedent 0, the decision threshold should be at th0, and when there is a precedent 1, the decision threshold should be at th1. Therefore, an adaption of the receiver threshold th is necessary to be at an optimum.

Figure 5:
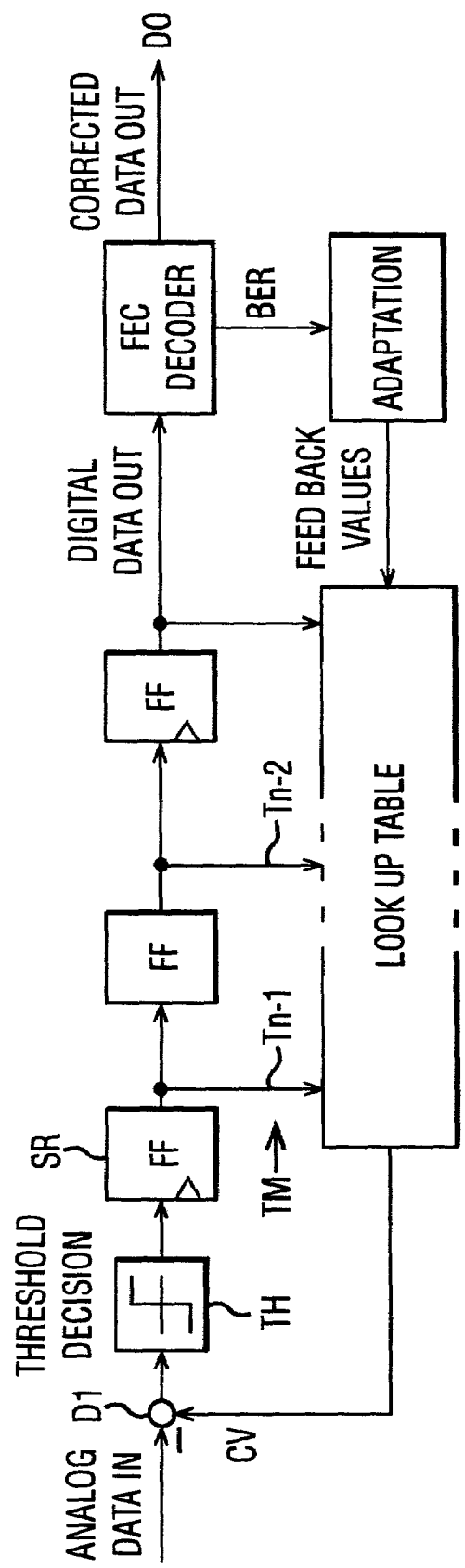
FIG. 5 is a receiver with a decision feedback equalizer.

FIG. 5 shows a receiver wherein an adaption of the threshold th is made. Analog data arrive at an analog data input DI and are sampled in a threshold decision component TH so as to produce digital data which pass through a shift register SR having a predetermined number of stages or flip-flops FF. The digital data are processed in a decoder FEC which makes forward error correction, and the corrected data pass through a data output DO. The decoder FEC delivers a bit error rate BER including numbers of corrected 0's and corrected 1's. The BER signal is delivered to an adaption circuit which may be incorporated in a computer.

The shift register SR is a means for passing the digital data stream from input to output and has tap means TM to present bits of the data stream for the purpose of analysis to the adaption circuit which includes a look-up table. The shift register SR including the tap means TM is used to tap bits from the bit stream, that is, the previous bit n−1 to the actual sampled bit n which is just passing through the threshold decision component TH, and the preceding bit n−2 are delivered through the tap $T_{n-1}$ and $T_{n-2}$ (and further taps, if provided) to counters for being further processed. The previous bit n−1 can have the values 0 or 1, and this is also true for the n−2 bit. Therefore, the following transitions may occur:

0/0, 0/1, 1/0, and 1/1.

For each of these transitions, the number of the corrected 0's and of the corrected 1's can be summed up and give a description of the behavior of the transmission channel. A correction value CV can be derived from the look-up table which is added in the data input DI to the incoming data signals which practically adapts the input threshold. Another possibility is to supply the CV signal to the threshold decision component TH and change its threshold decision value.

It is clear that the number of the flip-flops and therefore of the taps is not restricted onto two preceding bits. However, the number of the counters for the corrected 0's and 1's increases rapidly ($2^n$) with the number of the thresholds.

Figure 6:
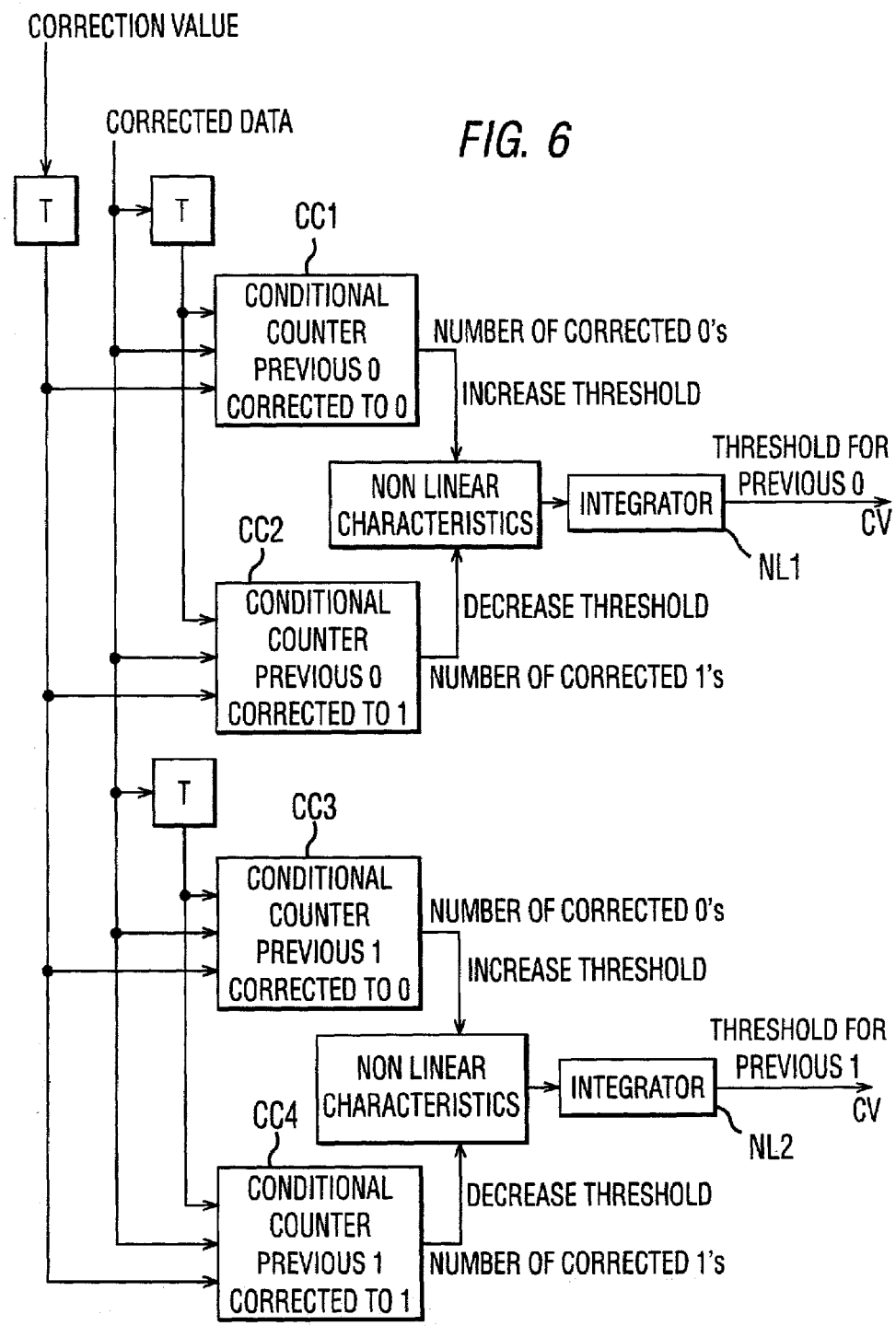
FIG. 6 is a possible detail of the receiver of FIG. 4.

FIG. 6 shows the look-up table implemented with "conditional counters". The correction value from the BER signal which may be 0 or 1 is delivered through a delay stage T to a row of the conditional counters CC1, CC2, CC3 and CC4. This is also true for the corrected data. Therefore, the conditional counter CC1 sums up the number of corrected 0's for previous 0 bits, the conditional counter CC2 sums the number of corrected 1 for previous 0 bits, the conditional counter CC3 sums the number of 0's for previous 1 bits and the conditional counter CC4 sums the number of corrected 1's for previous 1 bits. Conditional counters CC1 and CC2 influence through nonlinear characteristics a first integrator NL 1 which outputs a control value CV for the receiver threshold th when there was a previous 0 bit. Similarly, the conditional counters CC3 and CC4 influence through nonlinear characteristics a second integrator NL 2 producing a control value CV for the receiver threshold for the previous 1 bit. This means that in the graph of FIG. 4, the decision threshold value is shifted to th0 when a 0 bit precedes, and to th1, when a 1 bit precedes. The circuitry of FIGS. 5 and 6, therefore, adapts the receiver threshold th to a more probable distribution in time of incoming signal values for 0's and 1's bits.

Figure 7:
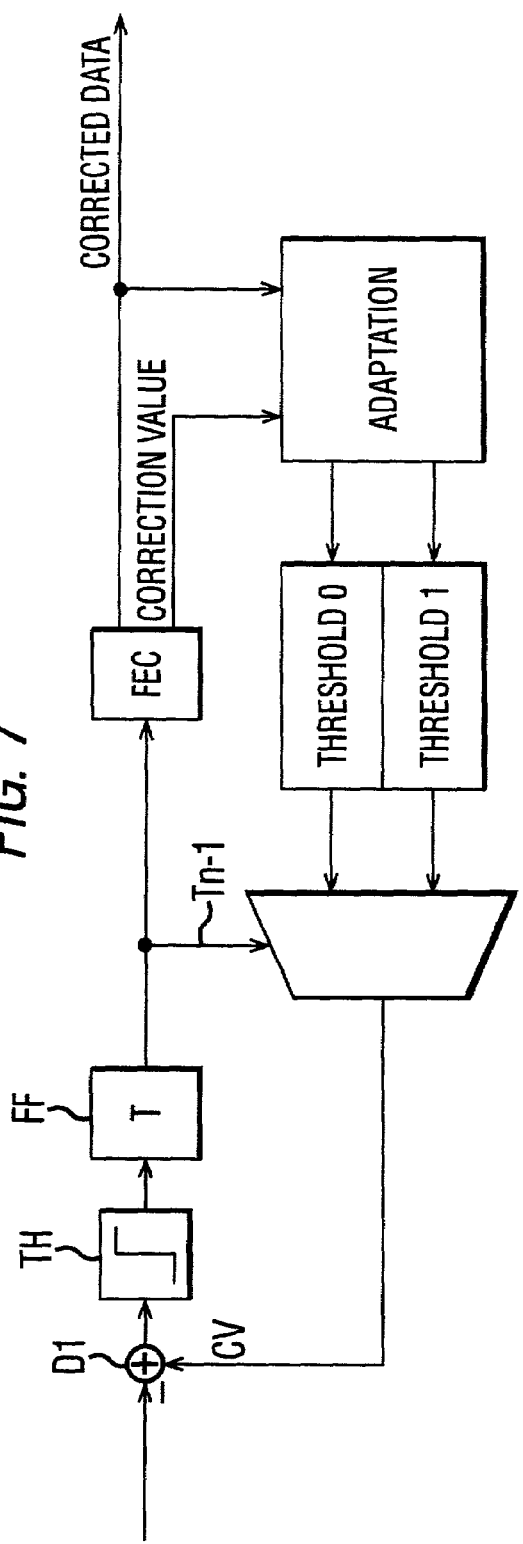
FIG. 7 is a further decision feedback equilizer.

FIG. 7 shows a receiver with a simplified adaption and look-up table. The data stream passes through a delay stage or flip-flop FF so that only one tap $T_{n-1}$ is present which delivers the previous bit n−1 to a gate circuitry which also receives feedback values from the adaption circuitry.

Dependent upon which of the signal values 0 or 1 is present for the previous bit, the threshold for the actual bit is set. This is indicated by the blocks termed "threshold 0" and "threshold 1".

Figure 8:
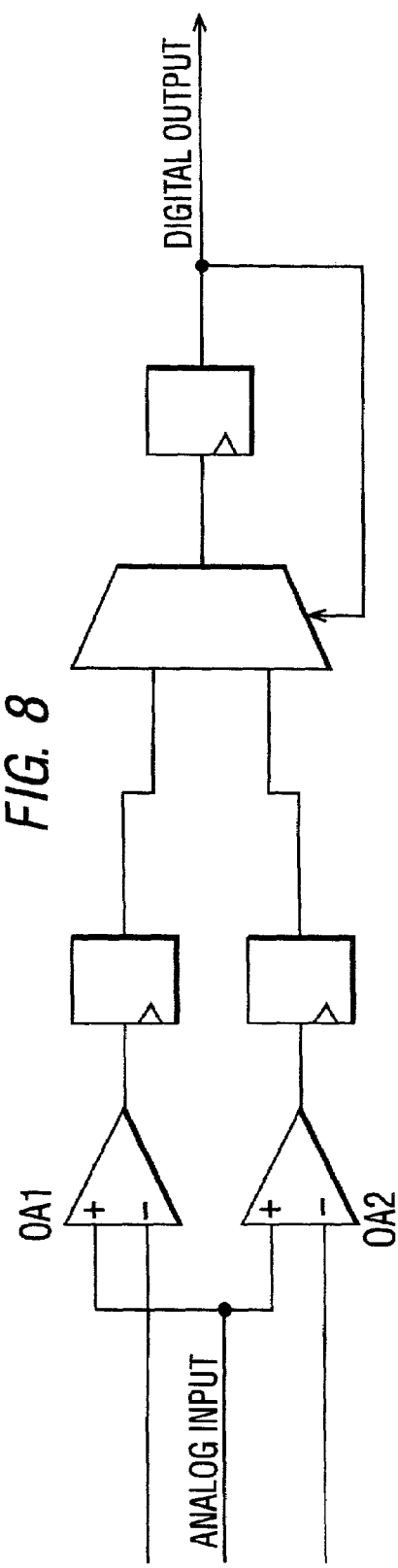
FIG. 8 is a possible detail from FIG. 7.

FIG. 8 shows further details. The analog input signal is connected to the positive input of a pair of comparators CMP1 and CMP2, the negative inputs thereof being connected to the blocks "threshold 0" and "threshold 1", respectively. Therefore, according to the previous bit value 0 or 1, comparator CMP1 or CMP2 is made effective in order to sample the actual bit value of the analog signal.

In FIG. 2, the analog filter or equalizer may include components DI and TH shown in FIG. 5, and the decision feedback equalizer DFE may include components of the serial register and the look-up table. Furthermore, the clock recovery circuit CR is shown for determining the sampling phase of the incoming analog data stream. The clock is used for shifting the data through the circuit in known manner. The decoder for forward error correction FEC provides the bit error signal BER to the adaption circuitry which uses this signal BER as a criteria for the adaption of the equalization parameters. Use of the adaptive threshold has already been explained. Also optimal sampling phase can be determined. One possibility is to dither one or several equalization parameters and look what happens with the bit error rate BER. The equalization parameters, for example the sampling phase, are changed in a strategy until best performance of the equalizer is obtained. Under normal traffic conditions, dithering is possible, because the bit error rate BER remains below a critical range ($<10^{-16}$). For this reason, data can be corrected, and no significant performance loss on the data traffic occurs during this trial-and-error method.

The invention claimed is:

1. A method of adjusting equalization parameters in a receiver, including the steps of:
   receiving at the receiver a data stream which has data blocks with an information section and an error correction section,
   correcting bits in the data block using error correction means, measuring a bit error rate (BER) from the number of corrected bits in the data block, changing a predetermined equalization parameter, measuring the bit error rate (BER) after change of the predetermined parameter, changing the predetermined equalization parameter with an amount and in a direction so as to lower the bit error rate (BER), continuing with measuring the bit error rate (BER) and changing the predetermined equalizing parameter until an optimum is reached; and wherein the previous bit (0 or 1) preceding a sampled bit is taken into consideration, in that the receiver threshold (th) is decreased when the previous bit is 0, and is increased when the previous bit is 1, the amount and direction of adjustment being derived from a look-up table or a circuit forming a look-up table.

2. The method of claim 1 wherein incoming data are converted into digital form and subdivided into blocks which are processed for error correction and adjustment of equalization parameter.

3. A receiver, which has an adjustable threshold, comprising an input (DI) for receiving analog data;

a threshold decision circuit (TH) and e clock recovery unit (CR) arranged to convert analog data received at the input into digital data;

shift register means (SR) for passing the digital data stream through the receiver to a data output (DO);

an error correction means (FEC) operative to correct the digital data and to provide a bit error rate (BER) ; and a feedback loop having adaption means (AD) for adjusting parameters of a receiver equalizer, characterized in that the feedback loop includes a circuit in the kind of a look-up table which, based upon the bit error rate (BER) and tap means (TM) in the shift register means (SR), provides signals indicating the amount and direction of adjustment of the receiver threshold (th), the tap means (TM) including a flip-flop (FF) for providing the value of the previous bit preceding the actual sampled bit, the look-up table circuit increasing or decreasing the value of the receiver threshold (th) for the actual received data bit.

4. A receiver, which has an adjustable threshold, comprising an input (DI) for receiving analog data;

a threshold decision circuit (TH) and a clock recovery unit (CR) arranged to convert analog data received at the input into digital data;

shift register means (SR) for passing the digital data stream through the receiver to a data output (DO);

an error correction means (FEC) operative to correct the digital data and to provide a bit error rate (BER) ; and a feedback loop having adaption means (AD) for adjusting parameters of a receiver equalizer, characterized in that the feedback loop includes a circuit in the kind of a look-up table which, based upon the bit error rate (BER) and tap means (TM) in the shift register means (SR), provides signals indicating the amount and direction of adjustment of the receiver threshold (th), the tap means (TM) including flip-flops (FF) in series and gate circuits so as to detect the direction of signal transitions (0/1 and 1/0), a pair of conditional counters (CC1, CC2; CC3, CC4) being assigned to each signal transition (0/1 and 1/0), one conditional counter of the pair sums the number of the corrected bits of one value (1), and the other counter sums the number of the corrected bits of the other value (0), the summed numbers of the counters being supplied to each an integrator (NL 1, NL 2) which provides the adjustment value to the threshold decision circuit (TH).

* * * * *